United States Patent
Chan

(10) Patent No.: US 9,531,930 B2
(45) Date of Patent: Dec. 27, 2016

(54) SURVEILLANCE DEVICE

(71) Applicant: VIVOTEK INC., New Taipei (TW)

(72) Inventor: Chih-Chieh Chan, New Taipei (TW)

(73) Assignee: VIVOTEK INC., New Taipei (TW)

( * ) Notice: Subject to any disclaimer, the term of this patent is extended or adjusted under 35 U.S.C. 154(b) by 259 days.

(21) Appl. No.: 14/461,054

(22) Filed: Aug. 15, 2014

(65) Prior Publication Data
US 2015/0070493 A1    Mar. 12, 2015

(30) Foreign Application Priority Data

Sep. 6, 2013   (TW) .............................. 102132313 A

(51) Int. Cl.
| | |
|---|---|
| H04N 7/18 | (2006.01) |
| H04N 5/225 | (2006.01) |
| G03B 17/02 | (2006.01) |
| G03B 17/08 | (2006.01) |
| G03B 17/12 | (2006.01) |

(52) U.S. Cl.
CPC ............ H04N 5/2256 (2013.01); G03B 17/02 (2013.01); G03B 17/08 (2013.01); G03B 17/12 (2013.01); H04N 5/2252 (2013.01); G03B 2215/0575 (2013.01)

(58) Field of Classification Search
CPC .................................................. H04N 5/2252
USPC ......................................................... 348/143
See application file for complete search history.

(56) References Cited

U.S. PATENT DOCUMENTS

| | | |
|---|---|---|
| 2003/0227547 A1 | 12/2003 | Iddan |
| 2012/0105400 A1* | 5/2012 | Mathew ............... H04N 5/2251 345/207 |
| 2013/0033606 A1 | 2/2013 | Takahashi et al. |

FOREIGN PATENT DOCUMENTS

| | | |
|---|---|---|
| DE | 202011101011 U1 | 9/2011 |
| EP | 2448243 A2 | 5/2012 |
| EP | 2503523 A1 | 9/2012 |
| JP | 2003008954 A | 1/2003 |
| JP | 2006106340 A | 4/2006 |
| KR | 20110136095 A | 12/2011 |

OTHER PUBLICATIONS

European Patent Office, "Office Action", Feb. 24, 2015, Germany.

* cited by examiner

*Primary Examiner* — Hung Dang
*Assistant Examiner* — Girumsew Wendmagegn
(74) *Attorney, Agent, or Firm* — Maschoff Brennan

(57) ABSTRACT

A surveillance device includes a shell, a sensing assembly and a transparent cover. The transparent cover is detachably disposed on the shell, to form an accommodating space together. The sensing assembly is disposed in the accommodating space. The transparent cover comprises a first light-transmitting cover, an annular light baffle and a second light-transmitting cover. The first light-transmitting cover is disposed on the shell and having a through hole. The annular light baffle disposed at the through hole has a first limiting surface and a second limiting surface. The first light-transmitting cover is pressed against the first limiting surface. The second limiting surface faces oppositely away from the accommodating space. The second light-transmitting cover is disposed on the annular light baffle and pressed against the second limiting surface. The first limiting surface and the (Continued)

second limiting surface prevent the second light-transmitting cover from moving toward the accommodating space.

9 Claims, 10 Drawing Sheets

SURVEILLANCE DEVICE

CROSS-REFERENCE TO RELATED APPLICATIONS

This non-provisional application claims priority under 35 U.S.C. §119(a) on Patent Application No(s). 102132313 filed in Taiwan, R.O.C. on Sep. 6, 2013, the entire contents of which are hereby incorporated by reference.

BACKGROUND

Technical Field

The disclosure relates to a surveillance device. More particularly, the disclosure relates to a surveillance device which comprises a transparent cover with improved structures.

Background

Surveillance technology is utilized for monitoring and recording statuses of an environment, and security personnel may be replaced due to the surveillance technology. The surveillance technology combined with optical identification or alarm systems has become a main passive security system, when incidents occur in the environment, the alarm systems may generate warning signals.

The main devices of the surveillance technology are surveillance cameras. The surveillance cameras are divided into indoor cameras and outdoor cameras according to different environments to which the surveillance cameras applied. The outdoor cameras are utilized for outdoor environments, so that they have to meet the demands of being water-proof, dust-proof and collision-resistant. Thus, the outdoor cameras not only have to be tested about their functions of water-proof, dust-proof and collision-resistant, but also have to be processed via an IK10 impact test. However, because the surveillance cameras not yet perfectly meet the demand of collision-resistant nowadays, it is important to improve the collision-resistant ability of the surveillance cameras.

Additionally, the outdoor cameras are utilized for the outdoor environments, so the image qualities of the outdoor cameras may be worse at night due to lack of brightness. In prior art, the surveillance cameras were assembled with light sources. However, the light sources were always disposed in shells of the surveillance cameras for protection, parts of lights emitted from the light sources were baffled by the shells. To sum up, the illumination efficiencies of the surveillance cameras were poor in prior art, such that it is important to improve the illumination efficiencies of the surveillance cameras.

SUMMARY

One aspect of the disclosure provides a surveillance device which comprises a shell, a sensing assembly and a transparent cover. The transparent cover is detachably disposed on the shell, to form an accommodating space together, and the sensing assembly is disposed in the accommodating space. The transparent cover comprises a first light-transmitting cover, an annular light baffle and a second light-transmitting cover. The first light-transmitting cover is disposed on the shell and having a through hole. The annular light baffle has a first limiting surface and a second limiting surface and is disposed at the through hole. The first light-transmitting cover is pressed against the first limiting surface, and the second limiting surface faces oppositely away from the accommodating space. The second light-transmitting cover is disposed on the annular light baffle and pressed against the second limiting surface, such that the first limiting surface and the second limiting surface prevents the second light-transmitting cover from moving toward the accommodating space.

BRIEF DESCRIPTION OF THE DRAWINGS

The disclosure will become more fully understood from the detailed description given herein-below and the accompanying drawings which are given by way of illustration only and thus are not limitative of the disclosure, and wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

Figure 1:
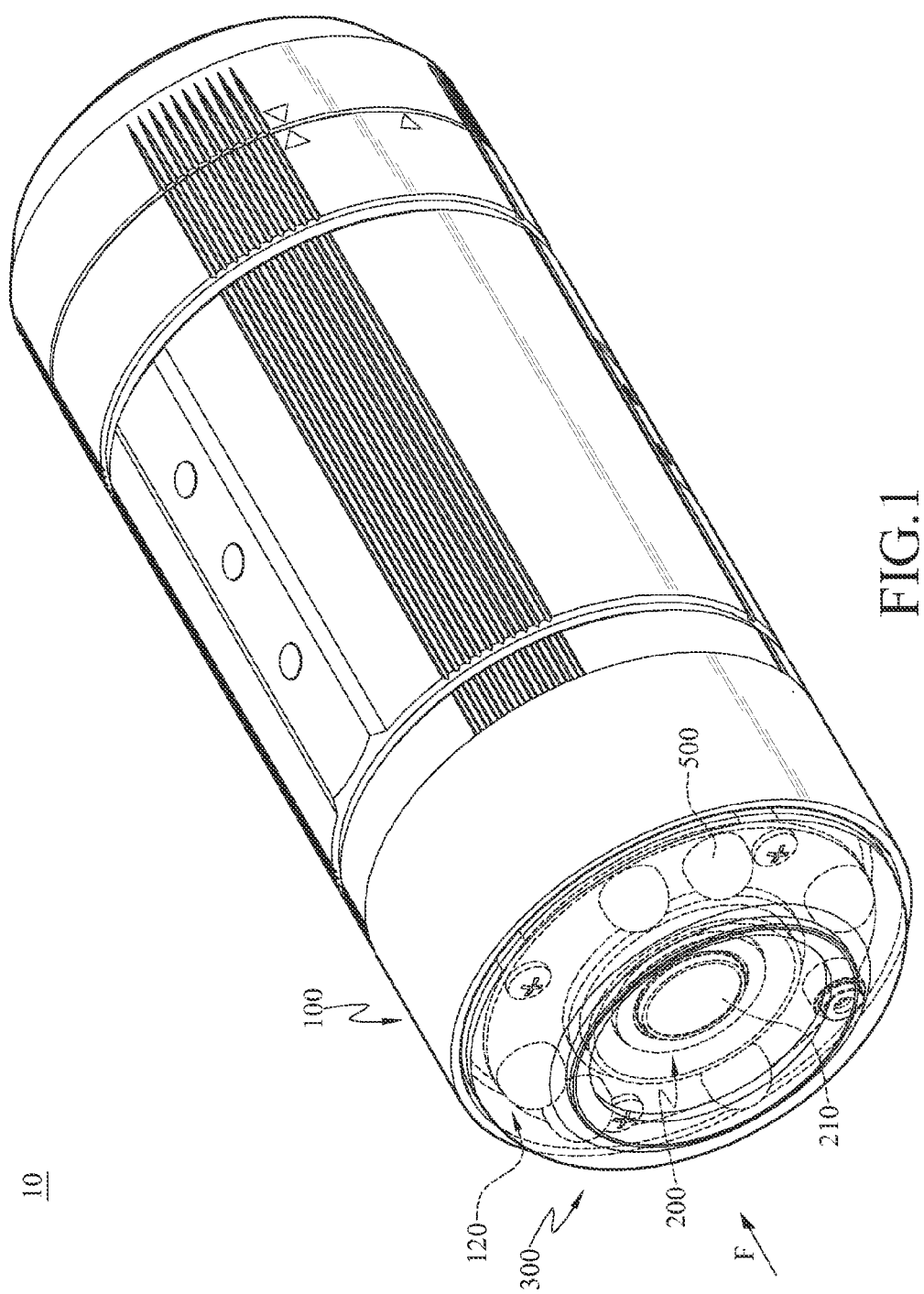
FIG. 1 is a perspective view of a surveillance device according to a first embodiment of the disclosure.
Figure 2:
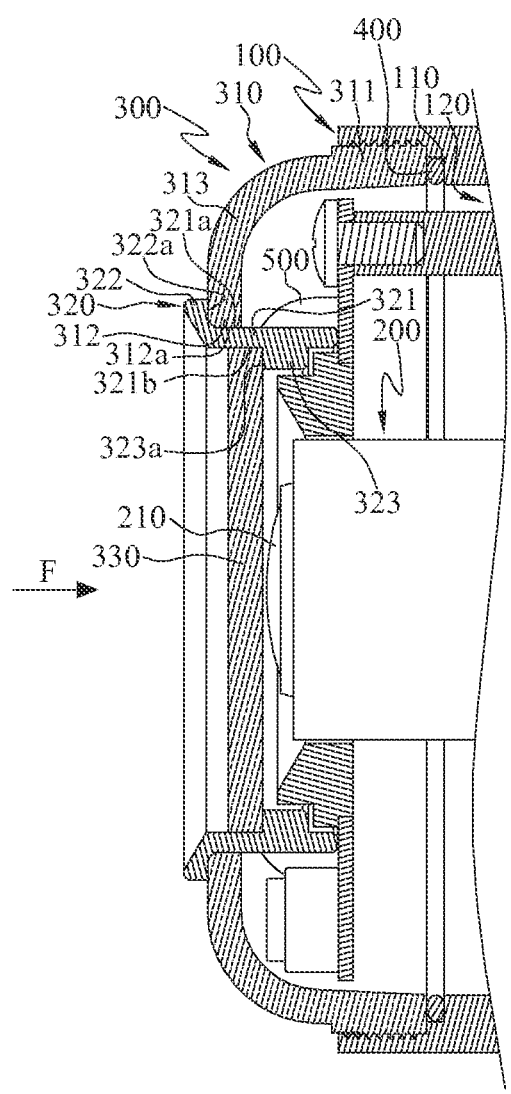
FIG. 2 is a partially sectional view in FIG. 1.
Figure 3:
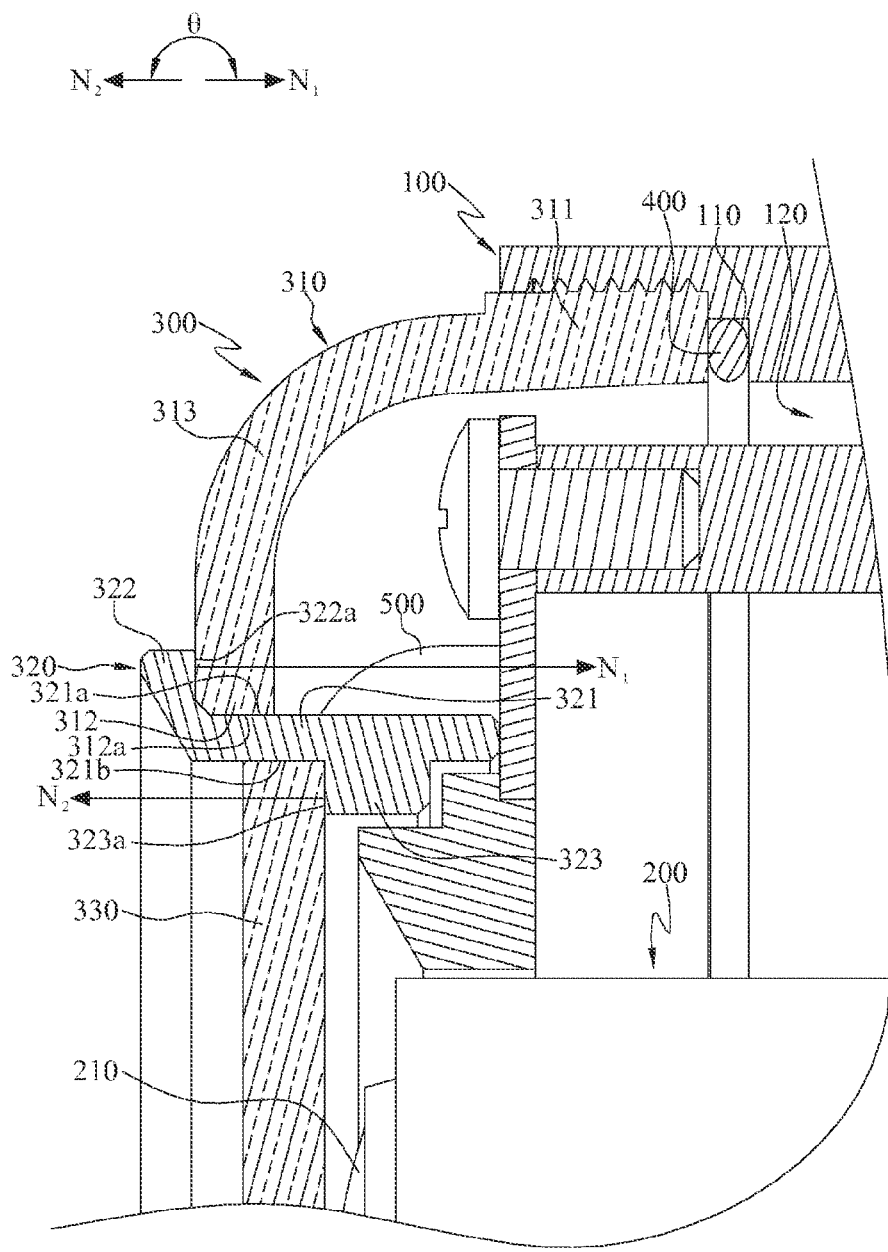
FIG. 3 is a partially enlarged view in FIG. 2.
Figure 4:
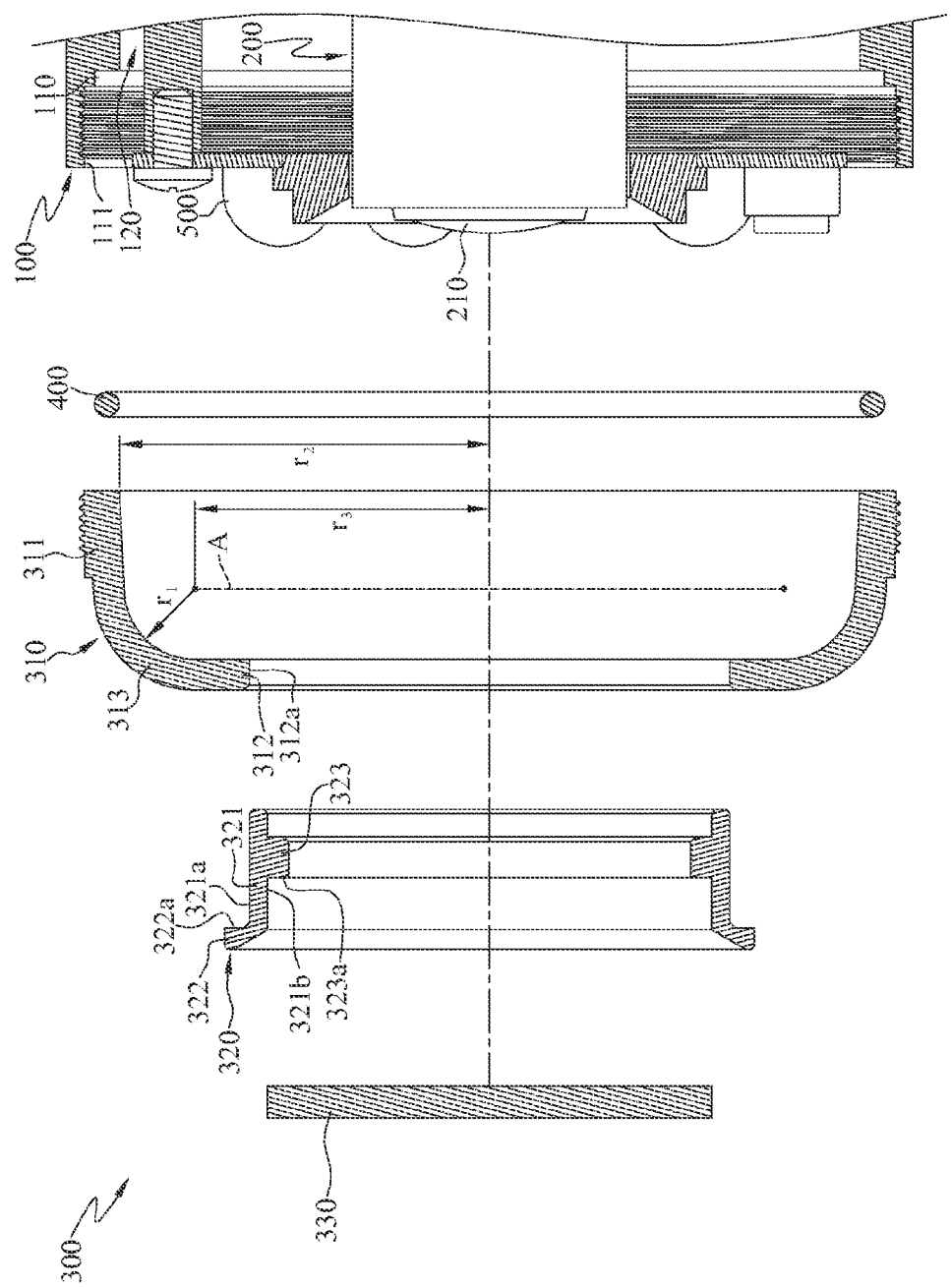
FIG. 4 is an exploded view in FIG. 2.

Please refer to FIG. 1 to FIG. 4. FIG. 1 is a perspective view of a surveillance device according to a first embodiment of the disclosure. FIG. 2 is a partially sectional view in FIG. 1. FIG. 3 is a partially enlarged view in FIG. 2. FIG. 4 is an exploded view in FIG. 2. In this embodiment, the surveillance device 10 comprises a shell 100, a sensing assembly 200 and a transparent cover 300. The shell 100 may be, but not limited to, made from plastic material by injection molding or made of aluminum by die casting. The shell 100 has an annular lateral surface 111 and an annular groove 110 formed by the annular lateral surface 111. Additionally, in this embodiment, the sensing assembly 200 is a photographing assembly including a lens module 210. However, in other embodiments, the sensing assembly 200 may be a light sensing assembly.

The transparent cover 300 is detachably disposed on the shell 100, to form an accommodating space 120 together. The sensing assembly 200 is disposed in the accommodating space 120. The transparent cover 300 comprises a first light-transmitting cover 310, an annular light baffle 320 and a second light-transmitting cover 330. The first light-transmitting cover 310 has a first fixed segment 311, a second fixed segment 312 and a bending segment 313. The bending segment 313 is connected to and located between the first fixed segment 311 and second fixed segment 312. The first fixed segment 311 is detachably disposed on the annular lateral surface 111 of the annular groove 110. In this embodiment, the first fixed segment 311 is screwed to the annular lateral surface 111. In other words, a surface of the first fixed segment 311, which face the annular lateral surface 111, and the annular lateral surface 111 both have screw threads, so that the first fixed segment 311 may be detachably screwed to the corresponding annular groove 110. However, in other embodiments, the shell 100 may not have the annular groove 110. In other words, a screw thread is formed at the inner wall surface 111 of the shell 100, and the first fixed segment 311 is directly screwed to the inner wall surface 111 of the shell 100. Additionally, the second fixed segment 312 has a through hole 312a.

Figure 5A:
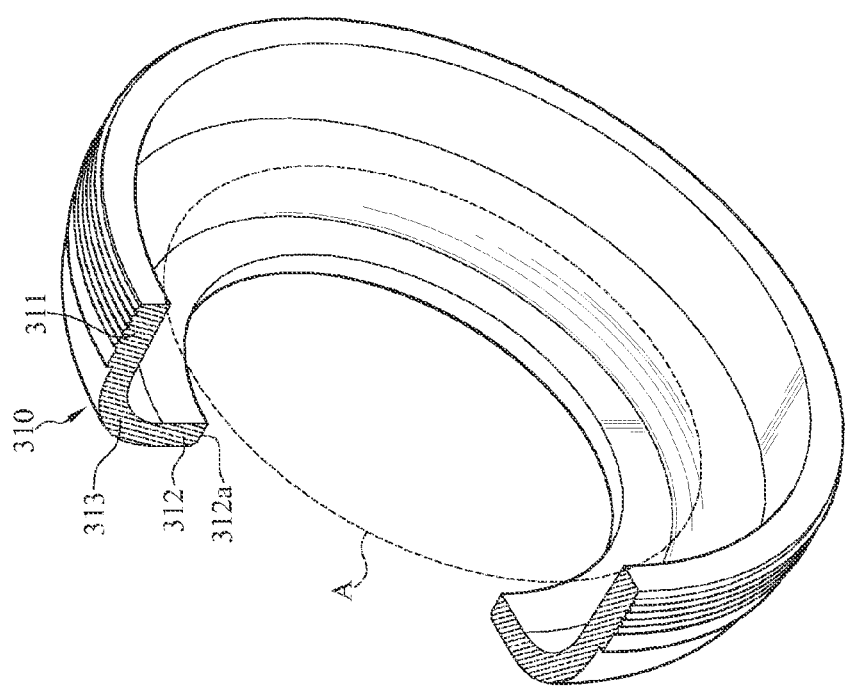
FIG. 5A is a sectional perspective view of a first light-transmitting cover in FIG. 1.
Figure 5B:
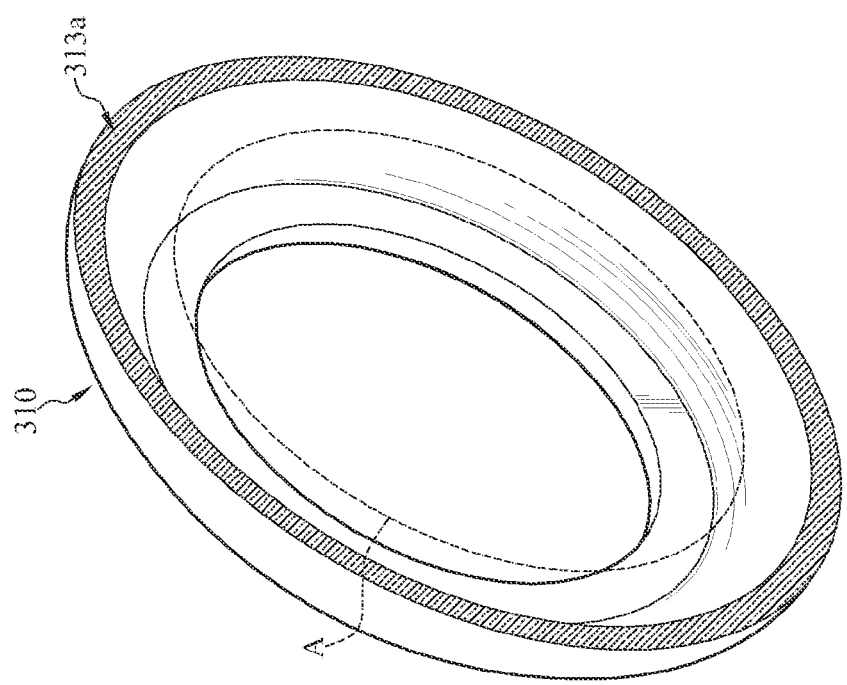
FIG. 5B is a cross-sectional view of the first light-transmitting cover in FIG. 1.

Please refer to FIG. 4 to FIG. 5B. FIG. 5A is a sectional perspective view of a first light-transmitting cover in FIG. 1. FIG. 5B is a cross-sectional view of the first light-transmitting cover in FIG. 1. The bending segment 313 is bent about an annular line A as curvature centers. Specifically, each point of the annular line A indicates each curvature center of the bending segment 313 with the same radius r1 of curvature. The annular line A is located at a side of the first light-transmitting cover 310 near the accommodating space 120. In other words, a radius r2 of the bending segment 313 is greater than a radius r3 of the annular line A. In this embodiment, the radius r1 of curvature is a constant, and the bending segment 313 may be, but not limited to, bent about the annular line which is a circle as curvature centers. In other embodiments, the bending segment 313 may be bent about another annular line A with different shapes. The radius r1 of curvature may not be a constant to form curvature with different radii. In this embodiment, the annular line A is annular (i.e., circular). In other words, the transverse plane 313a of the bending segment 313 is also annular (as shown in FIG. 5B).

The annular light baffle 320 comprises an enclosure wall 321, a first limiting part 322 and a second limiting part 323. The enclosure wall 321 is disposed at the through hole 312a and has an outer wall surface 321a and an inner wall surface 321b that is opposite to the outer wall surface 321a. The sensing assembly 200 is surrounded by the inner wall surface 321b to avoid being interfered with lateral lights such that the image quality may be maintained. The first limiting part 322 is connected to the outer wall surface 321a and has a first limiting surface 322a. The first limiting surface 322a is in contact with the first light-transmitting cover 310 and faces toward the accommodating space 120. The second limiting part 323 is connected to the inner wall surface 321b and has a second limiting surface 323a. The second limiting surface 323a faces oppositely away from the accommodating space 120 (i.e., faces outward). Additionally, in this embodiment (as shown in FIG. 3), an included angle θ is formed between a normal direction N1 of the first limiting surface 322a and a normal direction N2 of the second limiting surface 323a. The included angle θ is greater than 90 degrees and less than or equal to 180 degrees. In FIG. 3, only one included angle θ may be shown at a side of the surveillance device 10. In other embodiments, the included angle θ, which is greater than 90 degrees and less than or equal to 180 degrees, may be shown at another side of the surveillance device 10. The second light-transmitting cover 330 is located in a space surrounded by the inner wall surface 321b. A surface of the second light-transmitting cover 330 which faces the accommodating space 120 is in contact with the second limiting surface 323a.

In this and other embodiments, the surveillance device 10 further comprises a sealing ring 400. The sealing ring 400 is interposed between the first fixed segment 311 of the first light-transmitting cover 310 and the annular groove 110.

In this and other embodiments, the surveillance device 10 further comprises a light source assembly 500. The light source assembly 500 is disposed in the accommodating space 120 and located between the enclosure wall 321 and the bending segment 313. Additionally, the light source assembly 500 is surrounded by the bending segment 313, and the enclosure wall 321 is located between the sensing assembly 200 and the light source assembly 500. Accordingly, lights emitted from the light source assembly 500 may not be baffled by the shell 100, thus the illumination efficiency of the light source assembly 500 is increased, and the sensing quality of the sensing assembly 200 would not be interfered.

The first light-transmitting cover 310, the annular light baffle 320 and the second light-transmitting cover 330 may be screwed or adhered together. Additionally, the structural strength of the connections of the first light-transmitting cover 310, the annular light baffle 320 and the second light-transmitting cover 330 may be enhanced by the first limiting surface 322a and the second limiting surface 323a that are pressed against each other.

Furthermore, the material of the first light-transmitting cover 310 may be plastic, and the material of the second light-transmitting cover 330 may be plastic or glass with high transmittance. Because the function of the elastic deformation of plastic is better than that of the glass, when the transparent cover 300 is collided with other objects, the first light-transmitting cover 310 made from plastic may buffer the external force produced by the object easily rather than the first light-transmitting cover 310 made of glass.

In this embodiment, the transparent cover 300 is the combination of the first light-transmitting cover 310, the annular light baffle 320 and the second light-transmitting cover 330. Because the structural strength of the connections of these three components are weaker than other parts, when the transparent cover 300 is collided with other objects, the connections of the three components are broken first. To improve the collision-resistance of the transparent cover 300 and the structural strength of the connections of each component, the transparent cover 300 provides the first limiting part 322 disposed at the connections of the first light-transmitting cover 310, and provides the second limiting part 323 disposed at the connections of the annular light baffle 320 and the second light-transmitting cover 330.

As shown in FIG. 2, when the transparent cover 300 is applied with an external force F toward the accommodating space 120, a surface of the first light-transmitting cover 310, which faces oppositely away from the accommodating space 120, is pressed against the first limiting surface 322a of the annular light baffle 320, to prevent the annular light baffle 320 and the second light-transmitting cover 330 pressed against the second limiting surface 323a from moving toward the accommodating space 120 relative to the first light-transmitting cover 310. Meanwhile, a surface of the second light-transmitting cover 330 which faces toward the accommodating space 120 is pressed against the second limiting surface 323a of the annular light baffle 320, to prevent the second light-transmitting cover 330 from moving toward the accommodating space 120 relative to the annular light baffle 320. Because the first limiting surface 322a and the second limiting surface 323a are pressed against the first light-transmitting cover 310 and the second light-transmitting cover 330, respectively, the structural strength and the collision-resistance of the transparent cover 300 may be improved.

Furthermore, in this embodiment, the first light-transmitting cover 310 is made of plastic with the function of the elastic deformation, so that the bending segment 313 of the first light-transmitting cover 310 performs similar to a flexible arm. Accordingly, when the transparent cover 300 is collided with other objects, the bending segment 313 may buffer the external force easily to improve the collision-resistance of the transparent cover 300.

Figure 6:
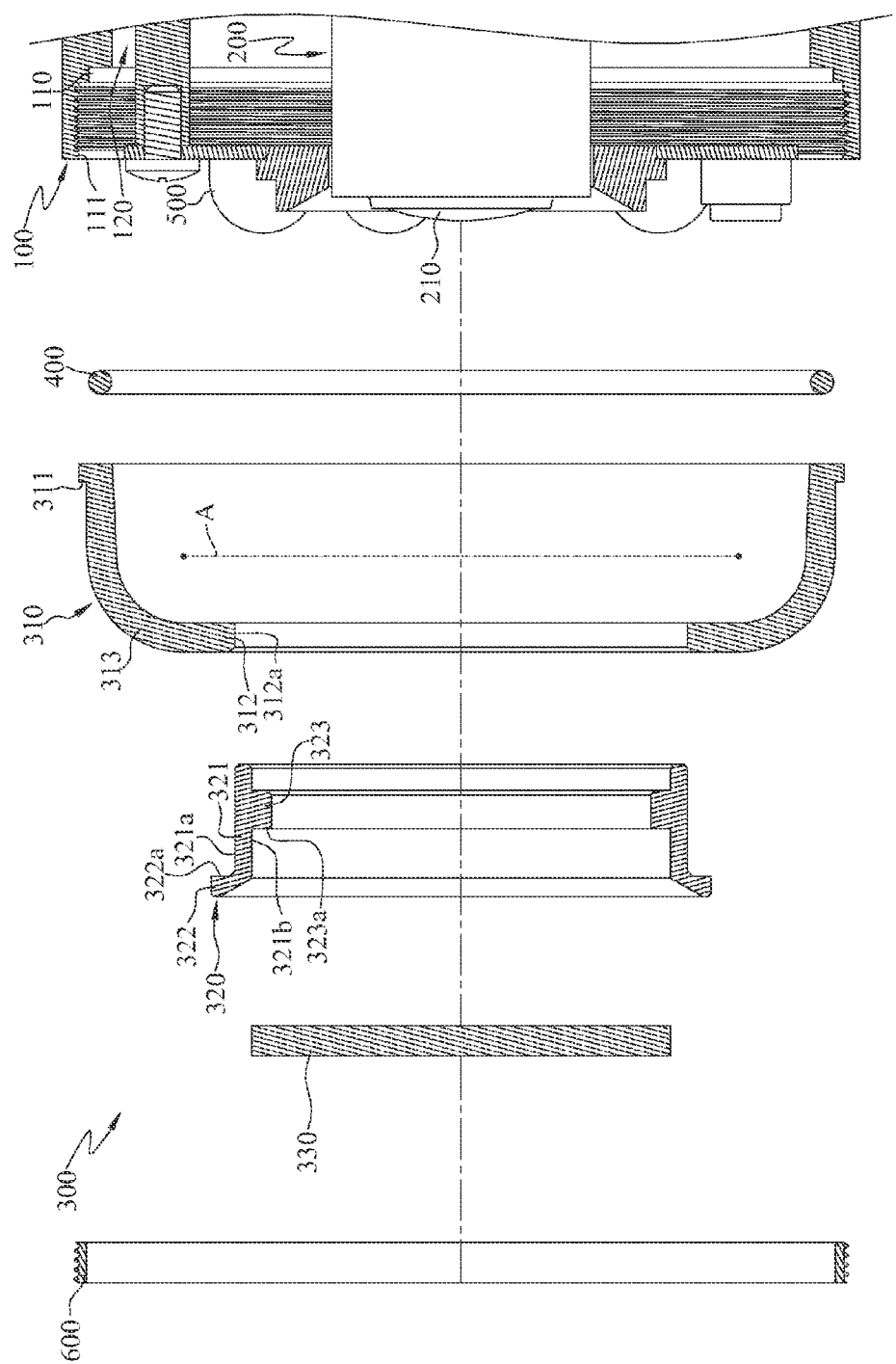
FIG. 6 is a cross-sectional view of a surveillance device according to a second embodiment of the disclosure.

Please refer to FIG. 6 which is a cross-sectional view of a surveillance device according to a second embodiment of the disclosure. Because this embodiment is similar to the first embodiment in FIG. 1, only the difference between this embodiment and the first embodiment will be described as follows. In this embodiment, the surveillance device 10 further comprises a fixed ring 600. The first light-transmitting cover 310 and the first fixed segment 311 are detachably disposed in the accommodating space 120 formed by the annular groove 110. The fixed ring 600 is detachably affixed to the annular lateral surface 111 of the annular groove 110. The first fixed segment 311 is interposed between the fixed ring 600 and the annular groove 110. The difference between this embodiment and the first embodiment in FIG. 1 is that the surface of the first fixed segment 311 which faces toward the annular lateral surface 111 does not have screw threads.

Figure 7:
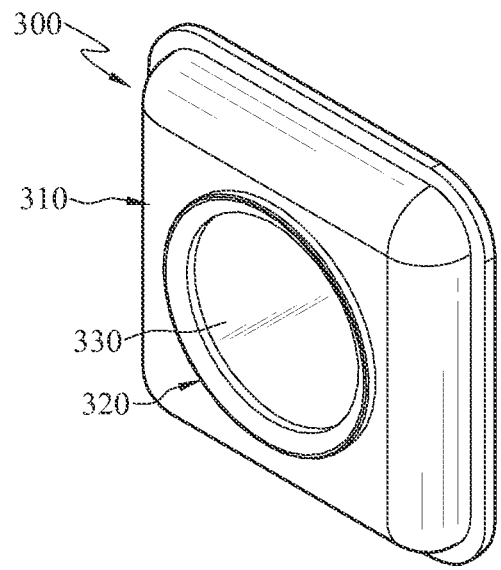
FIG. 7 is a perspective view of a transparent cover according to a third embodiment of the disclosure.
Figure 8:
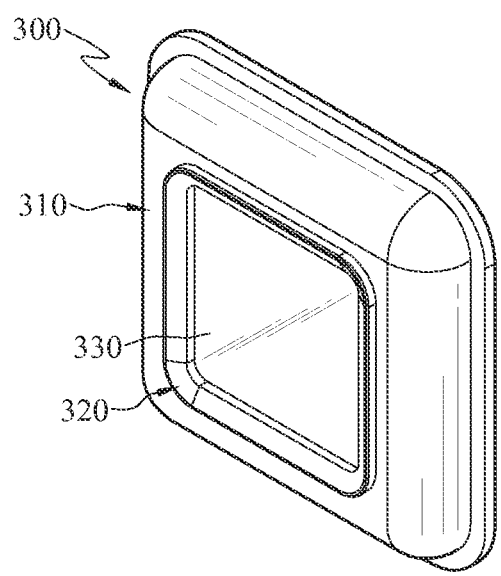
FIG. 8 is a perspective view of a transparent cover according to a fourth embodiment of the disclosure.

Please refer to FIG. 7 and FIG. 8. FIG. 7 is a perspective view of a transparent cover according to a third embodiment of the disclosure. FIG. 8 is a perspective view of a transparent cover according to a fourth embodiment of the disclosure. Since the third embodiment in FIG. 7 is similar to the first embodiment in FIG. 1, only the difference between the third embodiment and the first embodiment will be described as follows. As shown in FIG. 7, the transverse plane of the bending segment 313 is square in this embodiment. Accordingly, the annular line A of the bending segment 313 is square.

As shown in FIG. 8, since the third embodiment in FIG. 7 is similar to the fourth embodiment in FIG. 8, only the difference between the third embodiment and the fourth embodiment will be described as follows. In the fourth embodiment, the annular light baffle 320 and the second light-transmitting cover 330 are both square.

Figure 9:
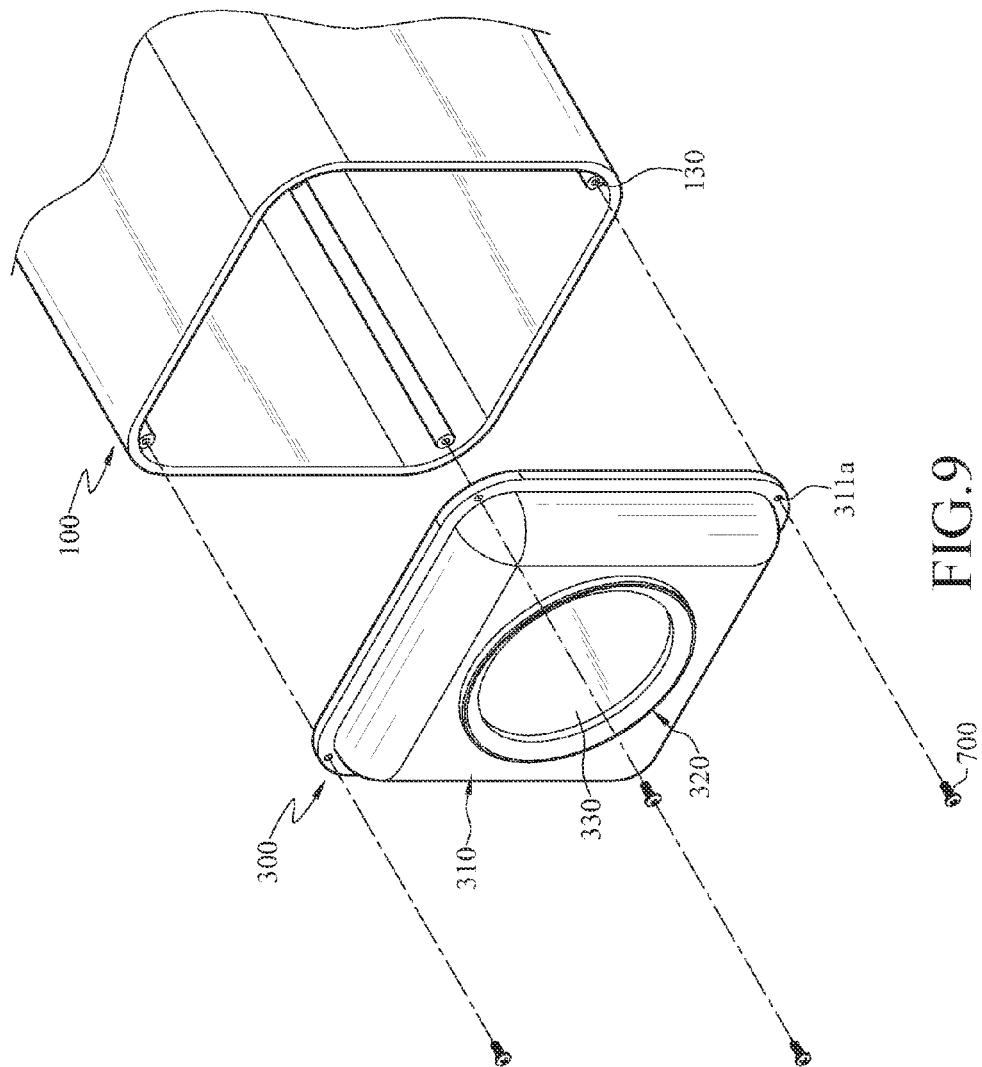
FIG. 9 is an exploded view of a transparent cover and a shell according to a fifth embodiment of the disclosure.

Please refer to FIG. 9 which is an exploded view of a transparent cover and a shell according to a fifth embodiment of the disclosure. Since this embodiment is similar to the third embodiment in FIG. 7, only the differences between this embodiment and the first embodiment will be described as follows. In this embodiment, the surveillance device 10 further comprises a plurality of fixed components 700. The shell 100 has a plurality of first fixing holes 130. The first fixed segment 311 of the transparent cover 300 has a plurality of second fixing holes 311a. The plurality of fixed components 700 are detachably affixed to the plurality of first fixing holes 130 through the plurality of second fixing holes 311a, respectively.

Figure 10:
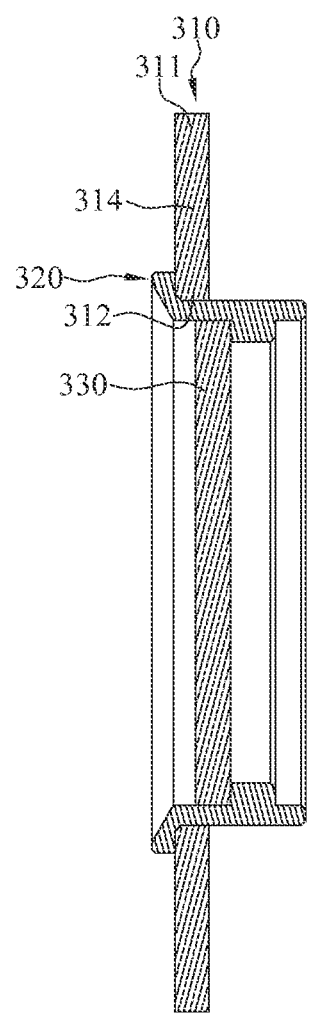
FIG. 10 is a partially sectional view of a surveillance device according to a sixth embodiment of the disclosure.

Please refer to FIG. 6 and FIG. 10. FIG. 10 is a partially sectional view of a surveillance device according to a sixth embodiment of the disclosure. Because the sixth embodiment in FIG. 10 is similar to the second embodiment in FIG. 6, only the differences between the second embodiment and the sixth embodiment will be described as follows. In this embodiment, the surveillance device 10 further comprises a fixed ring 600. The shell 100 has an annular groove 110. The first light-transmitting cover 310 has a first fixed segment 311, a second fixed segment 312 having the through hole 312a, and a plate segment 314. The plate segment 314 is connected to and located between the first fixed segment 311 and second fixed segment 312. The fixed ring 600 is detachably affixed to the annular groove 110. The first fixed segment 311 is interposed between the fixed ring 600 and the annular groove 110. The second fixed segment 312 is pressed against the first limiting surface 322a. The light source assembly 500 is covered by the plate segment 314. In other words, the difference between the second embodiment in FIG. 6 and this embodiment is that the bending segment 313 in FIG. 6 is replaced by the plate segment 314.

According to the surveillance device of the disclosure, the first limiting surface is pressed against the surface of the first light-transmitting cover which faces oppositely away from the accommodating space, and the second limiting surface is pressed against the surface of the second light-transmitting cover which face toward the accommodating space, such that the first limiting surface and the second limiting surface prevent the second light-transmitting cover from moving toward the accommodating space relative to the annular light baffle. Accordingly, the structural strength of the connections of the first light-transmitting cover, the annular light baffle and the second light-transmitting cover may be increased. Additionally, the function of collision-resistant of the surveillance device may also be improved.

Furthermore, the light source assembly is surrounded by the bending segment of the first light-transmitting cover, so that lights emitted from the light source assembly may not be baffled by the shell, and the illumination efficiency of the light source assembly may be improved.

The disclosure will become more fully understood from the said embodiment for illustration only and thus does not limit the disclosure. Any modifications within the spirit and category of the disclosure fall in the scope of the disclosure.

What is claimed is:

1. A surveillance device, comprising:
    a shell;
    a sensing assembly; and
    a transparent cover detachably disposed on the shell, to form an accommodating space together, wherein the sensing assembly is disposed in the accommodating space, and the transparent cover comprises:
    a first light-transmitting cover disposed on the shell and having a through hole;
    an annular light baffle comprising an enclosure wall, a first limiting part having a first limiting surface, and a second limiting part having a second limiting surface, wherein the enclosure wall is disposed at the through hole and has an outer wall surface and an inner wall surface that is opposite to the outer wall surface, wherein the first light-transmitting cover is pressed against the first limiting surface, and the second limiting surface faces oppositely away from the accommodating space; and
    a second light-transmitting cover disposed on the annular light baffle and pressed against the second limiting surface, such that the first limiting surface and the second limiting surface prevent the second light-transmitting cover from moving toward the accommodating space, wherein the second light-transmitting cover is surrounded by the inner wall surface, the first limiting part is connected to the outer wall surface, the first limiting surface is in contact with the first light-transmitting cover and faces toward the accommodating space, the second limiting part is connected to the inner wall surface, the second limiting surface is in contact with the second light-transmitting cover, an included angle is formed between a normal direction of the first limiting surface and a normal direction of the second limiting surface, and the included angle is greater than 90 degrees and less than or equal to 180 degrees.

2. The surveillance device according to claim 1, further comprising a light source assembly disposed in the accommodating space, wherein the enclosure wall is located between the sensing assembly and the light source assembly.

3. The surveillance device according to claim 2, wherein the sensing assembly comprises a lens module.

4. The surveillance device according to claim 2, wherein the first light-transmitting cover has a first fixed segment, a second fixed segment having the through hole, and a bending segment connected to and located between the first fixed segment and second fixed segment, the first fixed segment is detachably disposed on the shell, the second fixed segment is pressed against the first limiting surface, and the light source assembly is surrounded by the bending segment.

5. The surveillance device according to claim 4, wherein the bending segment is bent about at least one annular line as curvature centers, and the annular line is located at a side of the first light-transmitting cover near the accommodating space.

6. The surveillance device according to claim 4, further comprising a fixed ring, wherein the shell has an annular groove, the first fixed segment is detachably disposed in a space formed by the annular groove, the fixed ring is detachably affixed to the annular groove, and the first fixed segment is interposed between the fixed ring and the annular groove.

7. The surveillance device according to claim 6, further comprising a sealing ring interposed between the first fixed segment and the annular groove.

8. The surveillance device according to claim 4, further comprising a plurality of fixed components, the shell having a plurality of first fixing holes, the first fixed segment having a plurality of second fixing holes, and wherein the plurality of fixed components are detachably affixed to the plurality of first fixing holes through the plurality of second fixing holes, respectively.

9. The surveillance device according to claim 2, further comprising a fixed ring, the shell having an annular groove, wherein the first light-transmitting cover has a first fixed segment, a second fixed segment having the through hole, and a plate segment connected to and located between the first fixed segment and second fixed segment, wherein the fixed ring is detachably affixed to the annular groove, the first fixed segment is interposed between the fixed ring and the annular groove, the second fixed segment is pressed against the first limiting surface, and the light source assembly is covered by the plate segment.

\* \* \* \* \*